(12) United States Patent
Singh (10) Patent No.: US 9,650,106 B1
(45) Date of Patent: May 16, 2017

(54) TWO WHEEL DRIVE BICYCLE WITH A DUAL CHAIN-AND-SPROCKET DRIVE MECHANISM DRIVEN BY A TWO-SIDED PADDLE-SPROCKET SYSTEM

(71) Applicant: Sanjeev Kumar Singh, Alpharetta, GA (US)

(72) Inventor: Sanjeev Kumar Singh, Alpharetta, GA (US)

( * ) Notice: Subject to any disclaimer, the term of this patent is extended or adjusted under 35 U.S.C. 154(b) by 0 days.

(21) Appl. No.: 15/257,974

(22) Filed: Sep. 7, 2016

Related U.S. Application Data (60) Provisional application No. 62/375,003, filed on Aug. 15, 2016.

(51) Int. Cl.
| | |
|---|---|
| *B62M 1/00* | (2010.01) |
| *B62M 1/36* | (2013.01) |
| *B62M 23/00* | (2006.01) |
| *B62K 3/02* | (2006.01) |
| *B62K 21/02* | (2006.01) |
| *B62M 9/00* | (2006.01) |

(52) U.S. Cl.
CPC .............. *B62M 1/36* (2013.01); *B62K 3/02* (2013.01); *B62K 21/02* (2013.01); *B62M 9/00* (2013.01); *B62M 23/00* (2013.01); *B62M 2009/005* (2013.01)

(58) Field of Classification Search
CPC ................................ B62M 23/02; B62K 3/02
USPC ........................................ 280/230, 240, 259
See application file for complete search history.

(56) References Cited

U.S. PATENT DOCUMENTS

| | | | | |
|---|---|---|---|---|
| 5,158,314 | A * | 10/1992 | Farras Pinos | B62M 23/00 280/230 |
| 5,332,244 | A * | 7/1994 | Turner | B62M 25/00 180/224 |
| 5,424,725 | A * | 6/1995 | Wandt | H01M 2/1055 340/7.63 |
| 6,068,279 | A * | 5/2000 | Dion | B62M 23/00 280/230 |
| 6,161,855 | A * | 12/2000 | Christini | B62K 25/08 280/230 |
| 2002/0109330 | A1* | 8/2002 | Tompsett | B62M 23/00 280/259 |

(Continued)

*Primary Examiner* — Tony Winner
(74) *Attorney, Agent, or Firm* — Sanjeev K. Singh (57) ABSTRACT

A multi-wheel-drive bicycle that includes a dual chain-and-sprocket drive mechanism mated with a two-opposite-sided paddle-main-sprocket system is provided. The multi-wheel-drive bicycle comprises a frame having first and second opposing sides and having front, rear and lower ends. A front wheel is rotatably mounted on the front end of the frame and a rear wheel is rotatably mounted on the rear end of the frame. The multi-wheel-drive bicycle further comprises a chain-driven rear-drive mechanism configured for transmitting rotational power to the rear wheel. The chain-driven rear-drive mechanism includes a rear main-drive sprocket disposed on the first side of the frame and located at the lower end of the frame. The multi-wheel-drive bicycle further comprises a chain-driven front-drive mechanism configured for transmitting rotational power to the front wheel. The chain-driven front-drive mechanism includes a front main-drive sprocket disposed on the second side of the frame being opposite of the first side of the frame and located at the lower end of the frame.

18 Claims, 6 Drawing Sheets

(56) References Cited

U.S. PATENT DOCUMENTS

2004/0090037 A1\* 5/2004 Smith ................... B62M 23/00
  280/230
2014/0335982 A1\* 11/2014 Bovi ....................... B62M 1/36
  474/58

\* cited by examiner

TWO WHEEL DRIVE BICYCLE WITH A DUAL CHAIN-AND-SPROCKET DRIVE MECHANISM DRIVEN BY A TWO-SIDED PADDLE-SPROCKET SYSTEM

CROSS REFERENCE TO RELATED APPLICATIONS

This application claims the priority benefit of the U.S. Provisional Application Ser. No. 62/375,003 entitled "A SINGLE PADDLE SYSTEM WITH A DUAL CHAIN-AND-SPROCKET DRIVE MECHANISM FOR A TWO WHEEL DRIVE BICYCLE," filed on Aug. 15, 2016, the contents of which are hereby incorporated by reference herein in their entirety.

BACKGROUND

1. Field

Aspects of the present invention relates to two wheel drive bicycles, and more particularly, a dual chain-and-sprocket drive mechanism driven by a two-sided paddle-sprocket system.

2. Description of the Related Art

A conventional bicycle includes a frame having a normally non-driven front wheel and a rear driven wheel rotatably mounted thereon. The rear wheel conventionally has a driven element thereon which may comprise a rear chain driven sprocket cluster having several different size gears and a rear derailleur mechanism. A pedal driven crankset, that includes a pedal sprocket or sprockets, is mounted on the frame and serves as a prime mover for the drive wheel. A drive chain is trained around one of the pedal sprockets and one of the sprockets of the rear sprocket cluster. The rear derailleur mechanism is manually operable to shift the drive chain to train it about any desired one of the sprockets of the rear sprocket cluster. If the crank set includes two or three pedal sprockets, a front derailleur mechanism is also mounted to shift the chain to train it about any desired one of the pedal gears. Such shifting of the drive chain allows the operator to select an optimum sprocket ratio for driving the bicycle over the terrain on which it is being ridden. These sprocket ratios are commonly referred to as "speeds". A rear wheel drive bicycle may have rear wheel and pedal sprocket clusters that provide a large number of speeds with 10, 18 and 21 speed bicycles being in widespread use. The frame also includes a seat for supporting the bicycle rider and a front steerably mounted fork on which the front wheel is rotatably mounted. Handle bars are connected to the front steerable fork for steering the bicycle in known manner. The rear and front derailleurs each have controls mounted on the frame in a position to be conveniently reached by the operator to shift speeds while pedaling the bicycle.

Bicycles are increasingly being ridden off of paved roads and on rough terrain, which is steep, unpaved, frequently wet or muddy and covered by vegetation in places. Off road trails are particularly prone to have treacherously slippery sections caused by mud or uncut vegetation such as grass and weeds. Because of the rough and slippery terrain bikes are driven over, increased traction is desired. To achieve such traction, it is known to provide a multi-speed bicycle with a drive mechanism that allows for simultaneous and constant driving of both the front and rear wheels. This type of drive mechanism will be referred to as a constant dual wheel drive.

Bicycles have traditionally operated as a single-wheel-drive vehicle. As is evidenced by their popularity, single-wheel-drive bicycles are suitable in most cases. Because they only employ single-wheel drive, however, the use of bicycles are, for the most part, somewhat limited to prepared surfaces such as paved streets, sidewalks, and groomed paths. Although just about everyone who has ever ridden a bicycle has ridden on gravel or unprepared surfaces, all riders know that it is more difficult to ride on these types of surfaces due to the fact that drive is being generated by only the rear wheel.

In any event, single-wheel-drive bicycles are the norm because of difficulties involved in transferring to the front wheel the drive generated by the rider. The difficulty in generating drive via the front wheel of a bicycle results from the need to allow the fork (on which the front wheel is mounted) freedom to turn substantially in either direction from the center position in order to permit the cyclist to steer the bicycle. Because the fork must be free to turn, it is not possible to directly connect the pedals to the front wheel.

As off road biking has gained broader appeal, the demands that riders place on their bicycles have increased dramatically. Downhill, snow, and endurance races demand the increased traction and mobility of a two wheel drive bicycle system. Conventional bicycles are powered through a chain linking the pedal crankshaft to the rear wheel. Bicyclists are now facing many obstacles where having only rear wheel drive can lead to bicycle damage or personal injury. For professional riders, precious race time is lost avoiding obstacles such as logs, rocks, loose sand, mud, or ice. Traction and climbing ability are severely limited in extreme mountain conditions by only having the rear wheel provide power. In fact, biking professionals teach that only through learning to keep your weight on the rear wheel will beginners ever hope to improve their off-road skills. Accordingly, there is a need in the industry for a two wheeled drive bicycle which efficiently transfers power from the pedals to the front wheels, provides the rider with increased ability to safely negotiate rough terrain, and which does not detract from the aesthetic qualities and appearances of the bicycle structure itself.

The concept of a two wheel drive bicycle is not a new one. Several two wheel drive bicycle systems are patented at present using various combinations of chains, flexible cable shafts, and rocker arms mounted on the handlebars to transfer power either directly from the pedals to the front wheel or from the rear wheel to the front wheel. While two-wheel-drive bicycles have been proposed, there remains a need for an easily-operable and readily steerable two-wheel-drive bicycle, so that riders will have greater opportunity for enjoyable cycling on off-road trails and other unprepared surfaces.

Therefore, a two-wheel-drive bicycle overcoming various problems and shortcomings of the prior art would be an important improvement in the art.

SUMMARY

Briefly described, aspects of the present invention relate to a two-wheel-drive bicycle that includes a dual chain-and-sprocket drive mechanism driven by a two-opposite-sided paddle-sprocket system. A two-wheel-drive bicycle has separate chain-and-sprocket drive mechanisms for the front and rear wheels configured to be both chain-and-sprocket drive mechanisms driven by a common paddle system which is standard on typical bicycles. A first chain is mounted on a first sprocket and a rear gear coupled to a rear wheel of the bicycle. A second chain is mounted on a second sprocket and a front gear coupled to a front wheel of the bicycle. Both the first and the second sprockets are coupled to a standard paddle system of the bicycle to be driven by legs and feet of a biker. The standard paddle system has a common shaft on which the first and the second sprockets are mounted. The first and the second sprockets may be mounted on left, right or one left one right configuration with respect to the bicycle sides. The chain-and-sprocket drive mechanisms may be multi-sprocket systems. The bicycle may include a multi-gear system to be driven at different gear ratios for generating different torques. The multi-sprocket systems enable setting different gear ratios for the front and rear wheels, selectively providing a different drive force/torque to both wheels. By providing a torque power separately to both rear and front wheels from the same paddles using the dual chain-and-sprocket drive mechanism, the two wheel drive bicycle will run more stable and have a better traction control over a road surface just like the 4×4 vehicles.

In accordance with one illustrative embodiment of the present invention, a two-wheel-drive bicycle is provided. The two-wheel-drive bicycle comprises a frame having front and rear portions and a center portion with upper and lower ends. The frame has first and second opposing sides and the frame includes a head tube having a first front sprocket mounted thereon. The two-wheel-drive bicycle further comprises a fork assembly attached to the front portion of the frame and pivotable about a steering axis. The fork assembly has a lower end and an upper end. The two-wheel-drive bicycle further comprises a front wheel rotatably mounted on the fork assembly. The fork assembly straddling and rotatably supporting the front wheel at the lower end. The fork assembly has a stem at the upper end for pivotally mounting the fork assembly in the head tube of the frame to enable steering of the front wheel about the stem. The two-wheel-drive bicycle further comprises a rear wheel rotatably mounted on the rear portion of the frame and having a rear sprocket. The two-wheel-drive bicycle further comprises a paddle assembly having first and second foot paddles. The paddle assembly is mounted at the lower end of the center portion in a shared driving relationship with the front wheel and the rear wheel. The two-wheel-drive bicycle further comprises a chain-driven rear-drive mechanism configured for transmitting rotational power to the rear wheel by alternate pumping of a bicycler's legs and feet which drives the paddle assembly. The chain-driven rear-drive mechanism includes a rear main-drive sprocket at the lower end of the center portion and disposed on the first side of the frame. The chain-driven rear-drive mechanism is coupled to the paddle assembly. The two-wheel-drive bicycle further comprises a chain-driven front-drive mechanism configured for transmitting rotational power to the front wheel by alternate pumping of the bicycler's legs and feet which drives the paddle assembly. The chain-driven front-drive mechanism includes a front main-drive sprocket at the lower end of the center portion and disposed on the second side of the frame being opposite of the first side of the frame. The chain-driven front-drive mechanism is coupled to the paddle assembly.

Consistent with another embodiment, a multi-wheel-drive bicycle is provided. The multi-wheel-drive bicycle comprises a frame having first and second opposing sides and having front, rear and lower ends. A front wheel is rotatably mounted on the front end of the frame and a rear wheel is rotatably mounted on the rear end of the frame. The multi-wheel-drive bicycle further comprises a chain-driven rear-drive mechanism configured for transmitting rotational power to the rear wheel. The chain-driven rear-drive mechanism includes a rear main-drive sprocket disposed on the first side of the frame and located at the lower end of the frame. The multi-wheel-drive bicycle further comprises a chain-driven front-drive mechanism configured for transmitting rotational power to the front wheel. The chain-driven front-drive mechanism includes a front main-drive sprocket disposed on the second side of the frame being opposite of the first side of the frame and located at the lower end of the frame.

According to yet another embodiment of the present invention, a method of transmitting rotational power to a front wheel and a rear wheel of a two-wheel-drive bicycle is provided. The method comprises providing a frame having first and second opposing sides and having front, rear and lower ends, rotatably mounting the front wheel on the front end of the frame, rotatably mounting the rear wheel on the rear end of the frame, providing a chain-driven rear-drive mechanism on the first side of the frame and at the lower end of the frame, providing a chain-driven front-drive mechanism on the second side of the frame being opposite of the first side of the frame and at the lower end of the frame, transmitting rotational power from a paddle assembly to the rear wheel with the chain-driven rear-drive mechanism including a rear main-drive sprocket disposed on the first side of the frame and, located at the lower end of the frame, and transmitting rotational power from the paddle assembly to the front wheel with the chain-driven front-drive mechanism including a front main-drive sprocket disposed on the second side of the frame being opposite of the first side of the frame and located at the lower end of the frame.

DETAILED DESCRIPTION

To facilitate an understanding of embodiments, principles, and features of the present invention, they are explained hereinafter with reference to implementation in illustrative embodiments. In particular, they are described in the context of a two-wheel-drive bicycle having a drive train including two-sided main front wheel and rear wheel sprockets of respective chain-driven drive mechanisms mounted on opposite sides of a frame and having a de-slacker device mounted on a chain interconnecting two sprockets of a chain-driven front-drive mechanism. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Embodiments of the present invention relate to a dual drive train mechanism of a two-wheel-drive bicycle that simultaneously transmits rotational power to both a front wheel and a rear wheel of the two-wheel-drive bicycle from a single paddle assembly. The two-wheel-drive bicycle includes a frame having first and second opposing sides and having front, rear and lower ends. A front wheel is rotatably mounted on the front end of the frame while a rear wheel is rotatably mounted on the rear end of the frame. The dual drive train mechanism includes a chain-driven rear-drive mechanism configured for transmitting rotational power to the rear wheel and a chain-driven front-drive mechanism configured for transmitting rotational power to the front wheel. The chain-driven rear-drive mechanism includes a rear main-drive sprocket disposed on the first side of the frame and located at the lower end of the frame. The chain-driven front-drive mechanism includes a front main-drive sprocket disposed on the second side of the frame being opposite of the first side of the frame and located at the lower end of the frame.

Although some embodiments of this invention may be described and illustrated herein in terms of a two-sided main front wheel and rear wheel sprockets of respective chain-driven drive mechanisms mounted on opposite sides of a frame, it should be understood that embodiments of this invention are not so limited, but are generally applicable to any two-wheel-drive bicycles such as left-sided or right-sided mountings of respective chain-driven drive mechanisms. Further, although some embodiments of this invention may be described and illustrated herein in the context of sprockets and chains, it should be understood that embodiments of this invention are not so limited, but are generally applicable to any drive train mechanisms, such as gear-based arrangements and assemblies including cables and pulleys.

Figure 1:
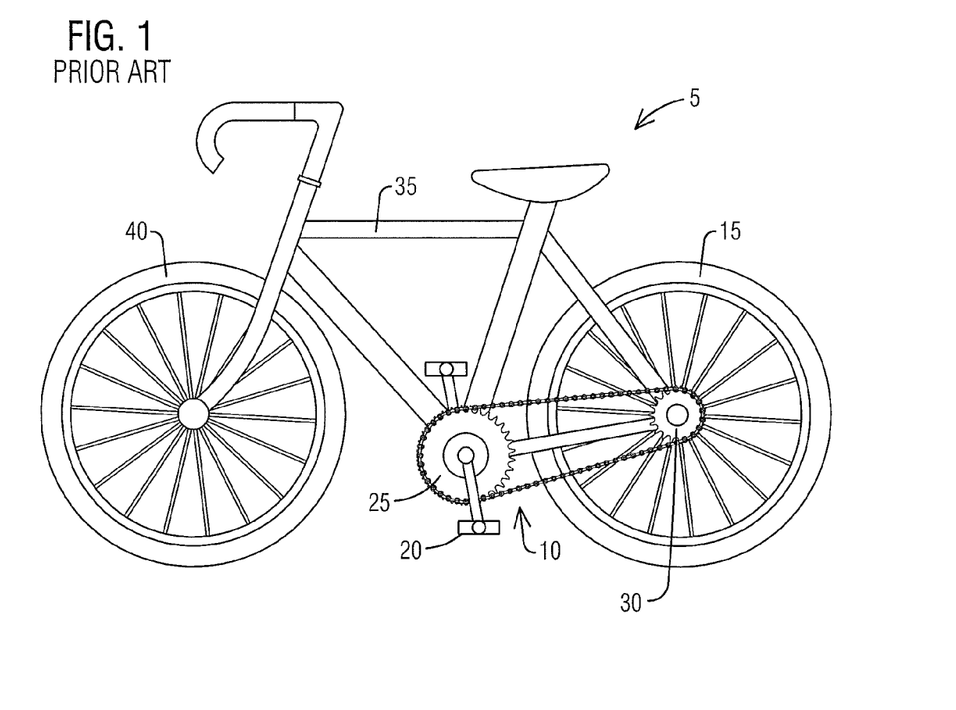
FIG. 1 illustrates a perspective view of a typical rear wheel drive bicycle.

FIG. 1 illustrates a perspective view of a typical prior-art rear wheel drive bicycle 5 including a single drive train mechanism 10 of a one-wheel-drive bicycle that transmits rotational power to a rear wheel 15 of the rear wheel drive bicycle 5 from movement of a paddle assembly 20 by a biker. The single drive train mechanism 10 includes a main-drive sprocket 25 and a rear wheel sprocket 30 both disposed on one side of a frame 35 and located at a lower end of the frame 35. The rear wheel drive bicycle 5 includes a front wheel 40 which is not powered or driven by any drive train mechanism, making it a free rotating wheel indirectly driven by the rotational power of the rear wheel 15 by virtue of being connected to the frame 35. But otherwise there is no separate or independent powering mechanism provided for driving the front wheel 40.

Figure 2:
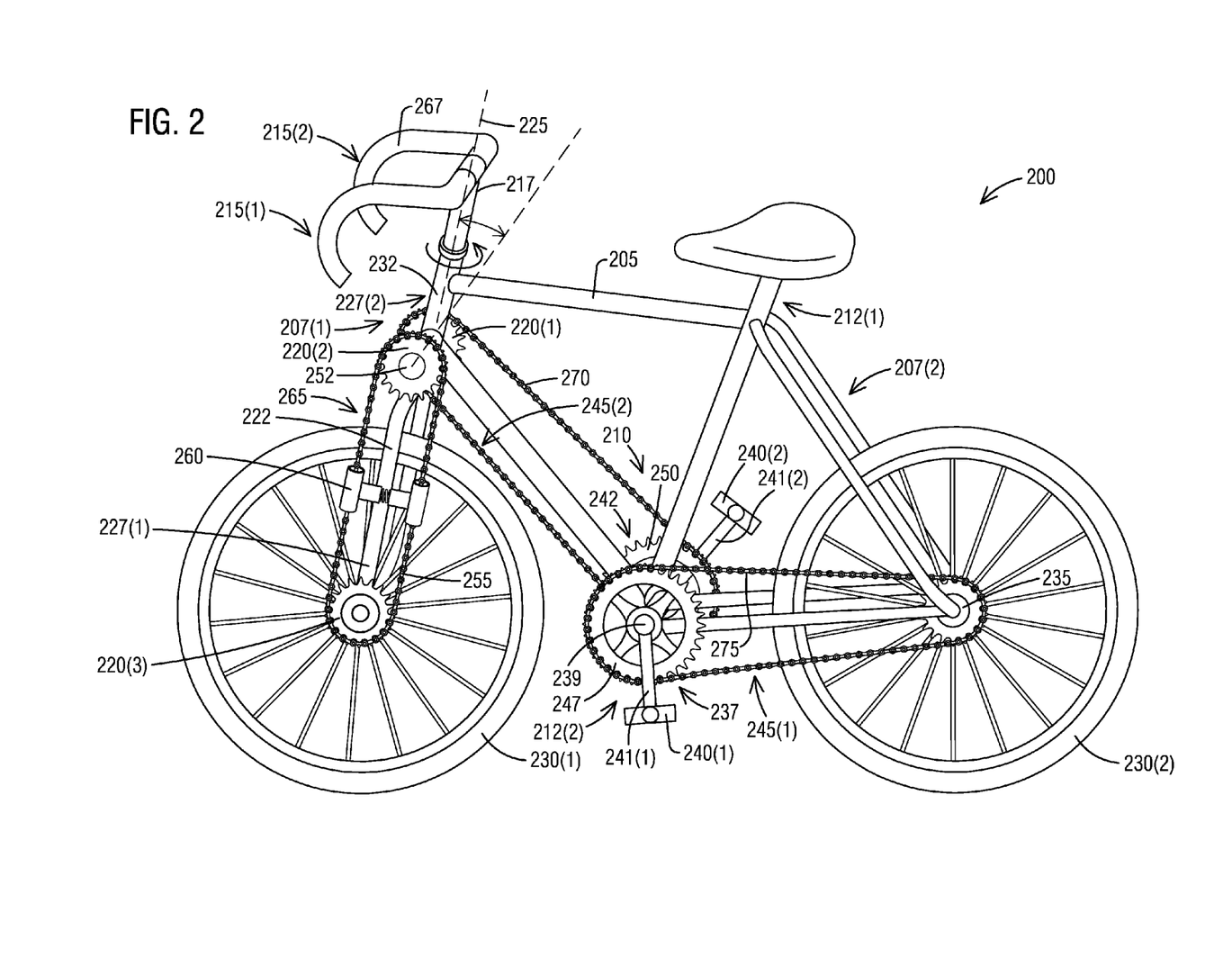
FIG. 2 illustrates a perspective view of a two-wheel-drive bicycle in accordance with an exemplary embodiment of the present invention.

Referring to FIG. 2, it illustrates a perspective view of a two-wheel-drive bicycle 200 in accordance with an exemplary embodiment of the present invention. The two-wheel-drive bicycle 200 includes a frame 205 having front and rear portions 207(1-2) and a center portion 210 with upper and lower ends 212(1-2). The frame 205 includes first and second opposing sides 215(1-2). The frame 205 further includes a head tube 217 having a first front sprocket 220(1) mounted thereon. The two-wheel-drive bicycle 200 further includes a fork assembly 222 attached to the front portion 207(1) of the frame 205 and pivotable about a steering axis 225. The fork assembly 222 has a lower end 227(1) and an upper end 227(2).

The two-wheel-drive bicycle 200 further includes a front wheel 230(1) rotatably mounted on the fork assembly 222. The fork assembly 22 straddles and rotatably supports the front wheel 230(1) at the lower end 227(1). The fork assembly 222 has a stem 232 at the upper end 227(2) for pivotally mounting the fork assembly 222 in the head tube 217 of the frame 205 to enable steering of the front wheel 230(1) about the stem 232. The two-wheel-drive bicycle 200 further includes a rear wheel 230(2) rotatably mounted on the rear portion 207(2) of the frame 205 and having a rear sprocket 235.

The two-wheel-drive bicycle 200 further includes a paddle assembly 237 having first and second foot paddles 240(1-2). The paddle assembly 237 is mounted at the lower end 212(2) of the center portion 210 in a shared driving relationship with the front wheel 230(1) and the rear wheel 230(2). The paddle assembly 237 includes a common shaft 239 having first and second arms 241(1-2) attached thereto with the first arm 241(1) coupled to the first foot paddle 240(1) and the second arm 241(1) coupled to the second foot paddle 240(2).

The two-wheel-drive bicycle 200 further includes a dual drive train mechanism 242 having a chain-driven rear-drive mechanism 245(1) configured for transmitting rotational power to the rear wheel 230(2) and a chain-driven front-drive mechanism 245(2) configured for transmitting rotational power to the front wheel 230(1). The dual drive train mechanism 242 ensures a smoother ride and greater contact of the front wheel 230(1) with the terrain for all-around improved rider experience. The chain-driven rear-drive mechanism 245(1) and the chain-driven front-drive mechanism 245(2) coupled to the paddle assembly 237 via the common shaft 239.

The chain-driven rear-drive mechanism 245(1) is configured for transmitting rotational power to the rear wheel 230(2) by alternate pumping of a bicycler's legs and feet which drives the paddle assembly 237. The chain-driven rear-drive mechanism 245(1) includes a rear main-drive sprocket 247 at the lower end 212(2) of the center portion 210 that may be disposed on the first side 215(1) of the frame 205. The chain-driven rear-drive mechanism 245(1) is coupled to the paddle assembly 237.

The chain-driven front-drive mechanism 245(2) is configured for transmitting rotational power to the front wheel 230(1) by alternate pumping of the bicycler's legs and feet which drives the paddle assembly 237. The chain-driven front-drive mechanism 245(2) includes a front main-drive sprocket 250 at the lower end 212(2) of the center portion 210 that may be disposed on the second side 215(2) of the frame 205 being opposite of the first side 215(1) of the frame 205 (see also FIG. 4). The chain-driven front-drive mechanism 245(2) is coupled to the paddle assembly 237.

The chain-driven front-drive mechanism 245(2) includes a second front sprocket 220(2) mounted coaxially to the first front sprocket 220(1) on a shaft 252 at a spaced apart distance. The spaced apart distance may be selected based on a width of the fork assembly 222. The spaced apart distance may be set such that the second front sprocket 220(2) is mounted beyond an outer edge of the fork assembly 222. The chain-driven front-drive mechanism 245(2) includes a third front sprocket 220(3) mounted coaxially to the front wheel 230(1). The second front sprocket 220(2) transfers rotational power from the chain-driven front-drive mechanism 245(2) along the steering axis 225 to the third front sprocket 220(3) mounted in a driving relationship with the front wheel 230(1).

The second front sprocket 220(2) fixed to a cross shaft drives a chain drive 255, and through the chain imparts torque through rotary motion for a full 360 degrees to a driven sprocket, the third front sprocket 220(3) coaxially mounted to the front wheel 230(1). The front wheel 230(1) is not freewheeling and is provided with a power transmission. A multi-speed transmission, e.g., 3-speed for the front wheel 230(1) may be used and a multi-speed transmission, e.g., 7-speed for the rear wheel 230(2) may be used. Both transmissions may be automatic and gear shifting is responsive to the actual centrifugal force resulting from the speed at which the wheels are rotating. Other mechanisms and gear combinations are also envisioned.

In one embodiment, the two-wheel-drive bicycle 200 may use a rigid shaft drive as the main power transfer means to the front wheel 230(1). Rigid shafts have the advantage of virtually instantaneous power transfer, whereas flexible shafts usually have from 10 to 20 degrees of rotation displacement when applied with a torque.

A drive system of the two-wheel-drive bicycle 200 is substantially incorporated into the frame 205. The frame 205 of the bicycle 200 may be however suitably modified into a configuration to enable a straight path for the drive shaft from the rear of the bike to the head and neck tubes. However, any frame configuration which substantially incorporates the rigid drive shaft system into the frame 205 from the vicinity of the rear wheel 230(2) to the head tube 217 and down the front fork assembly 222 of the bicycle 200 is envisioned. The frame 205 may be made of aluminium alloy, although other materials could serve equally well depending upon the target market and price.

The embodiments of present invention describe a two wheel drive bicycle, otherwise known as an all-wheel drive bicycle or a bicycle powered by both the rear and the front wheels 230(1-2) simultaneously. While embodiments of the present invention are described in connection with a bicycle, it is obviously applicable also to a tricycle. It is likewise applicable to a so-called tandem bicycle where the person up front does the steering and can crank the front wheel 230(1).

The chain-driven front-drive mechanism 245(2) includes the chain drive 255 interconnecting the second front sprocket 220(2) and the third front sprocket 220(3). The chain drive 255 consists of a series of chain links that mesh with toothed the second front sprocket 220(2) and the third front sprocket 220(3). The second front sprocket 220(2) and the third front sprocket 220(3) are locked to respective shafts of a driver and a driven. The chain drive 255 represents a form of flexible gearing. The chain drive 255 acts like an endless gear rack, while the second front sprocket 220(2) and the third front sprocket 220(3) are similar to pinion gears.

The chain drive 255 provides a positive form of power transmission. The links of the chain drive 255 mesh with the teeth of the second front sprocket 220(2) and the third front sprocket 220(3) and this action maintains a positive speed ratio between the driver and driven sprockets. The second front sprocket 220(2) and the third front sprocket 220(3) and the chain drive 255 being so mounted relative to the fork assembly 222 so as to enable movement of the chain-driven front-drive mechanism 245(2) to steer the front wheel 230 (1) during cycling.

The correct amount of slack in the chain drive 255 is essential for proper operation. Unlike belts, the chain drive 255 requires no initial tension and should not be tightened around the second front sprocket 220(2) and the third front sprocket 220(3). When the chain drive 255 is too tight, the working parts carry an extra load and work harder without delivering any more power than a properly installed chain drive. This causes chain wear due to increased pressure in the joints. Over-tightening also overloads the shaft and support bearings.

Too much slack is also harmful to the chain drive 255. Excessive chain slack causes vibration, whip, and reduced chain life because of the flexing condition. The chain-driven front-drive mechanism 245(2) includes a de-slacker device 260 mounted on the chain drive 255 to control a chain slack 265 in the chain drive 255. The de-slacker device 260 adjusts the chain slack 265 by acting as a chain tightener. The chain slack 265 may also be adjusted by shifting one of the second front sprocket 220(2) and the third front sprocket 220(3). A vertical chain drive such as the chain drive 255 is to be installed quite taut. However, one may loosen the chain tighteners to provide a working slack.

The de-slacker device 260 permits the rider to freely turn bicycle handle bars 267 thereby turning the fork assembly 222. Such turning can be accomplished without the need to adjust the tension in the mechanical linkage or accelerating the rotation of front wheel 230(1) in relation to the rear wheel 230(2). This allows for the smooth, safe operation of the two-wheel-drive bicycle 200. The de-slacker device 260 ensures that the chain-driven front-drive mechanism 245(2) does not interfere with steering or rotation of the front wheel 230(1).

In one embodiment, the chain-driven front-drive mechanism 245(2) may transmit power to the front wheel 230(1) through an interface mounted circumferentially on a front wheel hub. The front wheel hub may be a ratcheting hub which catches in one direction but freewheels in the other direction to enable the rider to coast without the pedals turning. The front wheel hub may be a modified freewheeling hub. The front wheel hub may catch to transmit power in one direction, but spin freely in the other direction meaning the rider can ride without the pedals turning. Such a hub is standard on rear wheels of bicycles but may be used on the front wheel 230(1) of the two-wheel-drive bicycle 200 to allow the front wheel 230(1) to turn while coasting.

A horizontal front chain drive 270 of the chain-driven front-drive mechanism 245(2) may have a chain slack on the bottom (do not allow the chain to rub on the guard or casing). Likewise, a horizontal rear chain drive 275 of the chain-driven rear-drive mechanism 245(1) may have a chain slack on the bottom. Tighteners or idlers may be located on the slack side of the chain drive 270, 275. For the chain-driven front-drive mechanism 245(2), the horizontal front chain drive 270 may be installed with a sag in the unloaded span of approximately 2% of the sprocket center distance.

To measure the actual amount of sag, one side of the horizontal front chain drive 270 may be pulled up taut, allowing all of the excess chain to accumulate in the opposite span. A straight edge over the front main-drive sprocket 250 and the first front sprocket 220(1), and a scale may be used to determine the sag.

Chain drives 255, 270, 275 and the sprockets 220(1-3), 235, 247, 250 are used to deliver positive power transmission in the forms of torque and speed ratio from one rotating shaft to another shaft. A standard roller chain drive such as the chain drives 255, 270, 275 are made up of alternate roller links. Roller links consist of two sidebars, two bushings, and two rollers. Links may have two sidebars and two pins, which are normally riveted. A standard roller chain drive such as the chain drives 255, 270, 275 is manufactured with all the rollers evenly spaced throughout the chain drive. The rollers have the ability to rotate when contacting the teeth of the sprocket 220 or 250. A roller chain drive such as the chain drives 255, 270, 275 may be of the single-strand type or multiple-strand type.

The sprockets 220(1-3), 235, 247, 250 may be made of fabricated steel, cast steel, cast iron, or synthetic materials such as nylon. The sprockets 220(1-3), 235, 247, 250 may be of solid plate design, or be of the open design using spokes. Larger fabricated steel or cast iron sprockets often use the open/spoke design to help reduce weight. The teeth on the fabricated sprockets 220(1-3), 235, 247, 250 are hardened.

The sprockets 220(1-3), 235, 247, 250 may provide a simpler and therefore less costly system for driving the front wheel 230(1) of a dual drive bicycle, enabling both drives to be used in conjunction. The sprockets 220(1-3), 235, 247, 250 may enable a two wheel bicycle drive in which both the legs can apply torque through a full 360 degree cranking motion.

While the use of the sprockets 220(1-3), 235, 247, 250 is preferred, such an embodiment does not preclude the use of some other type of wheel or cylinder. As used herein, the terms "sprockets" or the like are not, as should be apparent, in any sense limited to arrangements involving toothed gears. Instead, any common sorts of mechanical power-transferring devices, obviously including without limitation sprockets, chains and the like, can be used. A shown number of sprocket teeth on any of the sprockets 220(1-3), 235, 247, 250 should not be construed as limiting as other sprocket teeth configurations are clearly envisioned. The relative positioning of the sprockets 220(1-3), 235, 247, 250 of the two-wheel-drive bicycle 200 should not be considered as limiting in any manner for the present invention.

The sprockets 220(1-3), 235, 247, 250 may be designed with four distinct hub classes and are designated Type A, B, C, D. In a Type A, which is flat and has no hubs. They are mounted on flanges or hubs of the device they will be driving. The bore of the hub must be located in the center of the bolt hole circle and in the center of the sprocket itself. Type A sprockets may be welded to hubs or collars for mounting purposes. Type B sprockets have one hub protruding from one side of the sprocket. The hub is extended to one side. This design allows the sprocket to be fitted close to the machinery it is to be mounted on and helps to reduce a large overhung load on the machine's bearings. Type B sprockets are usually used on the driver or smaller sprocket of the drive set. Type C sprockets have hubs extended to both sides of the sprockets plate surface. This hub design is usually used on the driven sprocket where the pitch diameter is larger and it has more surface area in contact with the shaft. Both Type B and Type C sprockets are designed with either straight or tapered bores. Tapered bore hubs may be fitted to tapered shafts or installed on straight shafts with tapered bushings. A fourth type of sprocket occasionally used on chain drives is the Type D sprocket. This sprocket having a split hub, which could be of Type B or Type C permits installation or replacement of the sprocket without disturbing shafts or bearings. The sprocket halves are held together by heavy bolts.

The slack in the chain drives 270, 275 be on the bottom strand. The chain should wrap the sprocket at least 90 degrees. Chain wrap of 120 degrees is more desirable. In a horizontal chain drive such as the chain drives 270, 275, the rotation of the sprockets should be such that the slack resulting from wear and stretch is on the lower strand. This prevents the chain from grabbing between the sprockets.

With a vertical chain drive such as the chain drive 255, the chain tends to hang away from the lower sprocket, especially when the driver sprocket is in the lowest position. The shaft centers may be arranged so that they are at least 20 degrees off of true vertical. A chain tightening mechanism may be installed to help maintain proper chain tension. For example, the de-slacker device 260 may be used.

Proper alignment of sprocket and shaft is necessary to provide long wear life of the drive unit. Increased wear results from misalignment, due to rubbing of chain parts against the sides of the sprocket teeth and excessive friction wear in the joints caused by whipping and twisting of the chain. To ensure correct alignment, the following steps are recommended check to determine if the sprocket is positioned axially square on the shaft. Align the shafts parallel, using a tape measure or a feeler bar. Align the sprockets axially on the shafts, using a straight edge.

When in operation, the rider generates the drive force by pedaling the two-wheel-drive bicycle 200 in the conventional manner that is well known in the art. As the rider pedals, the drive force is transferred via mechanical linkage to both rear and front wheels 230(2) and 230(1). While various forms of mechanical linkage would be encompassed within the spirit of the invention, a sprocket-engaging chain similar to what is currently used on a bicycle is the preferred device for mechanically linking the chain-driven rear-drive mechanism 245(1) and the chain-driven front-drive mechanism 245(2) to front and rear wheels 230(2) and 230(1), respectively.

The two-wheel-drive bicycle 200 creates a much sturdier and effective two wheel drive bicycle which is easier to operate. The increased traction and mobility in off road situations resulting from this two wheel drive system is an advance in two wheel drive bicycle technology. A suitable longer or shorter wheel base clearance dimensions or head tube angle may be appropriate for the two-wheel-drive bicycle 200 and are well known to those skilled in the art.

The two-wheel-drive bicycle 200 may be a two wheel drive all terrain bicycle with a fully integrated two wheel drive. The two-wheel-drive bicycle 200 drive system dramatically increases traction and mobility, especially during uphill climbs on loose or slippery material. In order to reduce the weight of the two-wheel-drive bicycle 200, a weight reduction could be sought for the drive train components. A hollow rigid main drive frame 205 capable of transmitting the necessary amount of torque, possibly made out of composites, will significantly reduce the weight.

Figure 4:
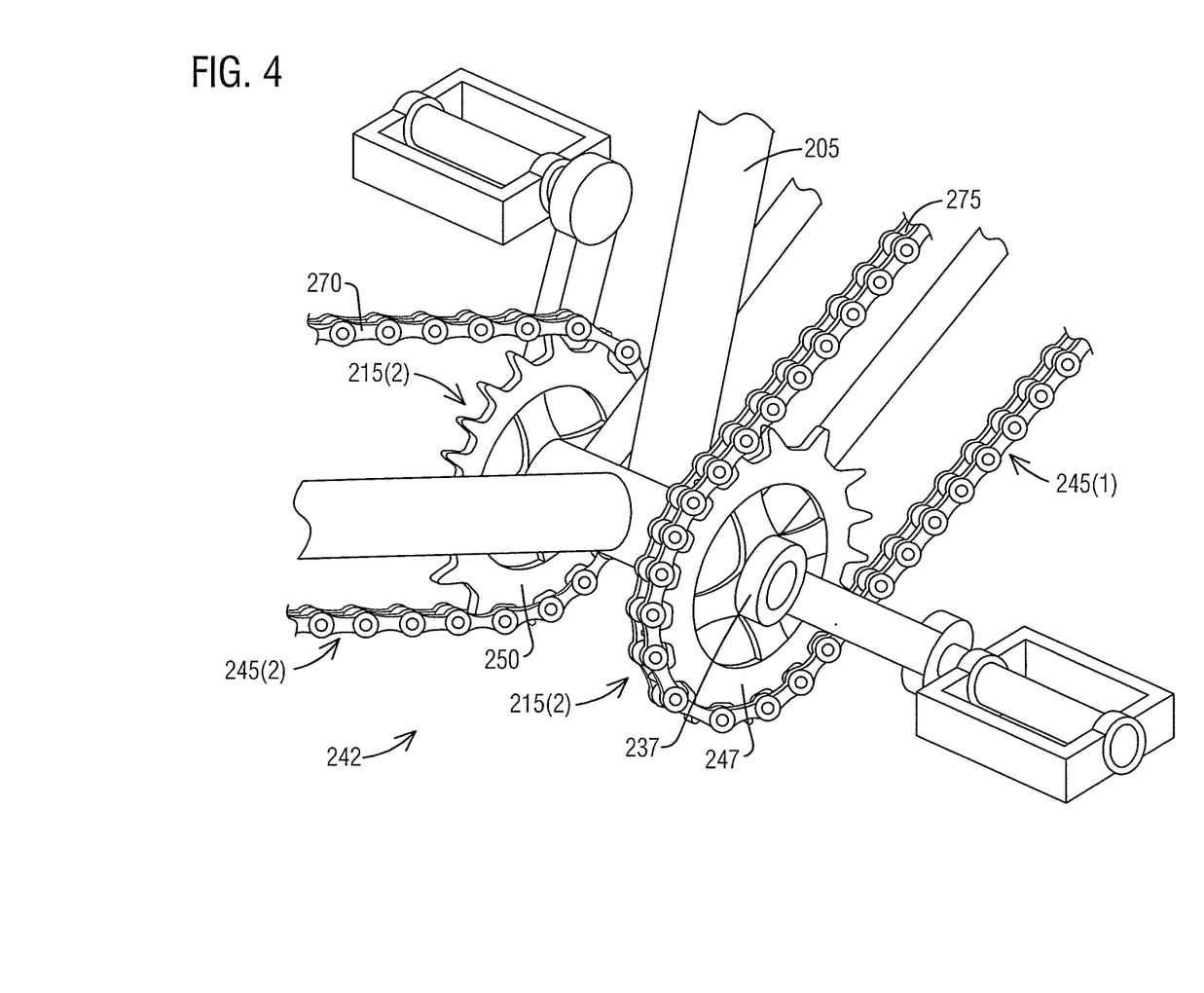
FIG. 4 illustrates a perspective view of two-sided main front wheel and rear wheel sprockets of respective chain-driven drive mechanisms according to one embodiment of the present invention.

The front and rear main sprockets 247, 250 may be suitably offset on a side of the frame 205. While a two-sided main sprockets frame is demonstrated, any frame design which incorporates a dual drive train in the vicinity of the paddle assembly 237 would be used. Those skilled in the art would understand dual-side mounting configurations of the front and rear main sprockets 247, 250 being mounted on the frame 205 on two opposite sides 215(1-2) as shown in FIG. 4 is not to be construed as limiting. As is well known in the art, alternative frame designs and embodiments could utilize other means for securing the front and rear main sprockets 247, 250 on the frame 205 in place and the means described are not to be construed as limiting.

Figure 3:
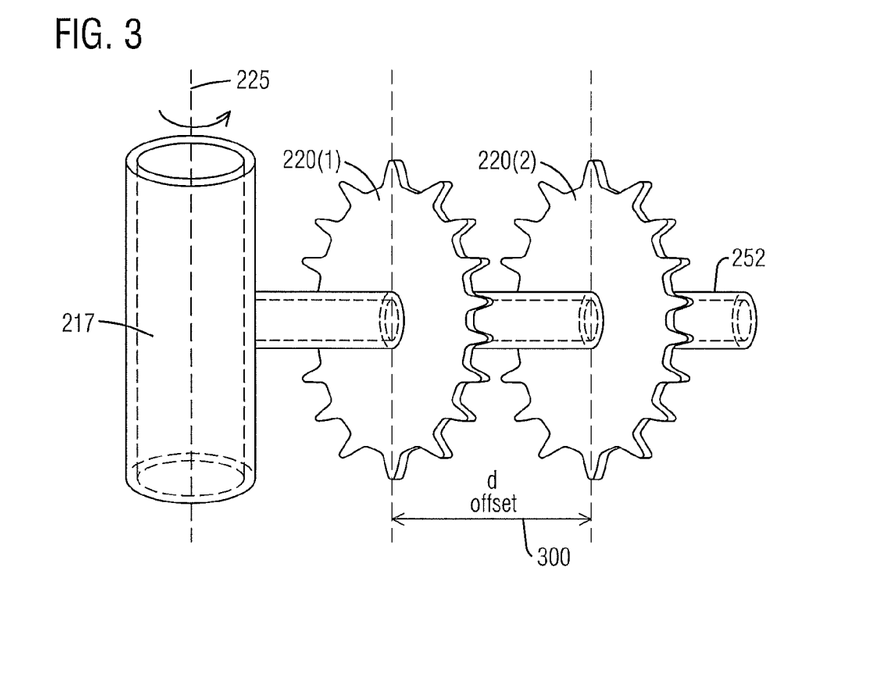
FIG. 3 illustrates a perspective view of two sprockets of a chain-driven front-drive mechanism according to one embodiment of the present invention.

Turning now to FIG. 3, it illustrates a perspective view of two front sprockets 220(1-2) of the chain-driven front-drive mechanism 245(2) according to one embodiment of the present invention. The chain-driven front-drive mechanism 245(2) includes the second front sprocket 220(2) mounted coaxially to the first front sprocket 220(1) on the shaft 252 at a spaced apart distance (d) 300. The shaft 252 is coupled to the head tube 217, for example, at a perpendicular relationship with it. The head tube 217 is mounted onto the frame 205 fixedly and is in a fixed relationship with the fork assembly 222. However, the fork assembly 222 is mounted movably with respect to the frame 205 so a movement of the fork assembly 222 relative to the frame 205 creates a stretch in the chain drive 255 so to accommodate this stretch the chain slack 265 is intentionally provided but desirely controlled by the de-slacker device 260. In other words, when the stretch is created in the chain drive 255 due to turning of the fork assembly 222 relative to the frame 205, a length of a chain links in between the second front sprocket 220(2) and the third front sprocket 220(3) is increased by borrowing a sag or a slack from the chain slack 265. However, when the stretch is removed from the chain drive 255 due to straitening of the fork assembly 222 relative to the frame 205, the length of the chain links in between the second front sprocket 220(2) and the third front sprocket 220(3) is decreased by returning a sag or a slack to the chain slack 265.

The spaced apart distance (d) 300 may be selected based on a width of the fork assembly 222 on one side with the steering axis 225 being the center of the fork assembly 222. The spaced apart distance (d) 300 may be set such that the second front sprocket 220(2) is mounted beyond an outer edge of the fork assembly 222. In one embodiment, the spaced apart distance (d) 300 is approximately same as the width of the fork assembly 222 on one side of the frame 205. Alternatively, the spaced apart distance (d) 300 is slightly more than the width of the fork assembly 222 on one side of the frame 205 based on a thickness (t) of the second front sprocket 220(2).

FIG. 4 illustrates a perspective view of two-sided main front wheel and rear wheel sprockets of respective chain-driven drive mechanisms according to one embodiment of the present invention. The two-wheel-drive bicycle 200 further includes the dual drive train mechanism 242 which has two-sided main front wheel and rear wheel sprockets of respective chain-driven drive mechanisms. The dual drive train mechanism 242 includes the chain-driven rear-drive mechanism 245(1) and the chain-driven front-drive mechanism 245(2).

The chain-driven rear-drive mechanism 245(1) includes the horizontal rear chain drive 275 and the sprockets 235 and 247 to transmit rotational power to the rear wheel 230(2). The chain-driven front-drive mechanism 245(2) includes the horizontal front chain drive 270 and the sprockets 220(1-3) and 250 to transmit rotational power to the front wheel 230(1). The chain-driven rear-drive mechanism 245(1) is located on a left side, e.g., the first side 215(1) of the frame 205. The chain-driven front-drive mechanism 245(2) is located on a right side, e.g., the second side 215(2) of the frame 205. Both the chain-driven rear-drive mechanism 245(1) and the chain-driven front-drive mechanism 245(2) are coupled to a common paddle assembly, i.e., the paddle assembly 237 which together drives both the chain-driven rear-drive mechanism 245(1) and the chain-driven front-drive mechanism 245(2).

In this way, the dual drive train mechanism 242 simultaneously transmits rotational power to both the front wheel 230(1) and the rear wheel 230(2) from different sides of the frame 205 in a balanced and equally distributed manner, making it a two-wheel-drive (2×2) bicycle which has a better grip on a road surface and drives more stable in adverse conditions such as wet weather, uneven pavement, gravel, and dirt roads. Also the weight of the dual drive train mechanism 242 is essentially equally distributed on two different sides of the frame 205, making the ride of two-wheel-drive bicycle 200 smoother and much more stable for a biker compared to the dual drive train mechanism 242 being located only on one side of the frame 205.

Figure 5:
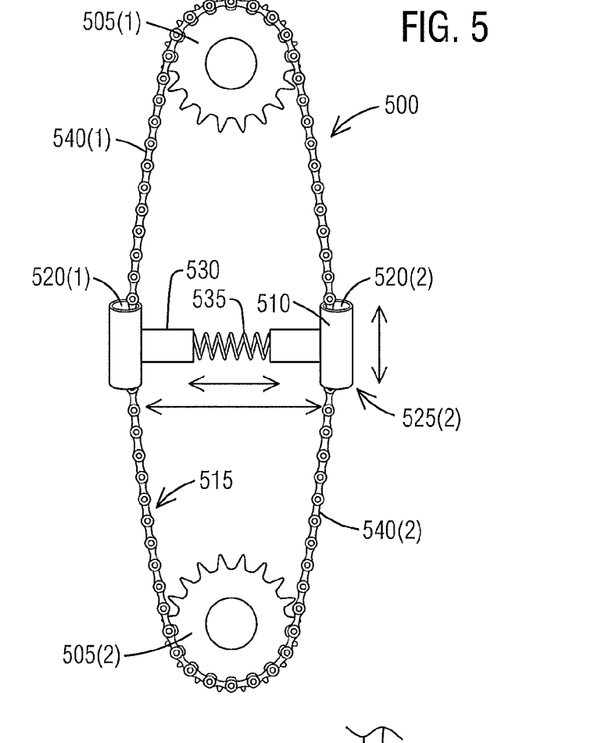
FIG. 5 illustrates a schematic view of a chain interconnecting two front wheel sprockets of a chain-driven front-drive mechanism according to one embodiment of the present invention.

As seen in FIG. 5, it illustrates a schematic view of a chain drive 500 interconnecting two front wheel sprockets 505(1-2) of the chain-driven front-drive mechanism 245(2) according to one embodiment of the present invention. The chain-driven front-drive mechanism 245(2) including a de-slacker device 510 mounted on the chain drive 500 to control a chain slack 515 in the chain drive 500. The de-slacker device 510 has first and second rings 520(1-2) on two opposite distal ends 525(1-2). The de-slacker device 510 further includes a tube 530 which separates the first and second rings 520(1-2) using a spring 535 housed partially in the tube 530 to selectively spread first and second links 540 (1-2) of the chain drive 500 away from each other or bring together in order to control a degree or extent or amount of the chain slack 515 present in the chain drive 500.

Based on a resilience of the spring 535 selected for a given length of the chain drive 500, the first and second links 540 (1-2) may be forced to continuously stay at a certain distance to spread the chain drive 500 wide enough so that the chain slack 515 is reduced and kept at a predetermined minimum level suitable to enable an optimal movement of the chain drive 500 to transfer the maximum power between the two front wheel sprockets 505(1-2). However, when the chain drive 500 is stretched due to turning of the fork assembly 222 in either direction from a normal straight position of the fork assembly 222, the de-slacker device 510 enables lengthening of the chain drive 500 by leveraging the chain slack 515 maintained in place by the resilience of the spring 535. This automatic use of an extra chain slack made available on the fly by the de-slacker device 510 on demand to the chain drive 255 of the chain-driven front-drive mechanism 245(2) in a time of a need ensures a smooth and an effective operation of the chain-driven front-drive mechanism 245(2) during operation of the two-wheel-drive bicycle 200 at all times without any significant loss or disruption of rotational power to the front wheel 230(1) while cycling. Also, the fork assembly 222 may be fully turned on both sides of the steering axis 225 without any obstruction or a compromise in rotational angle ability otherwise possible in a typical rear wheel drive bicycle.

Figure 6:
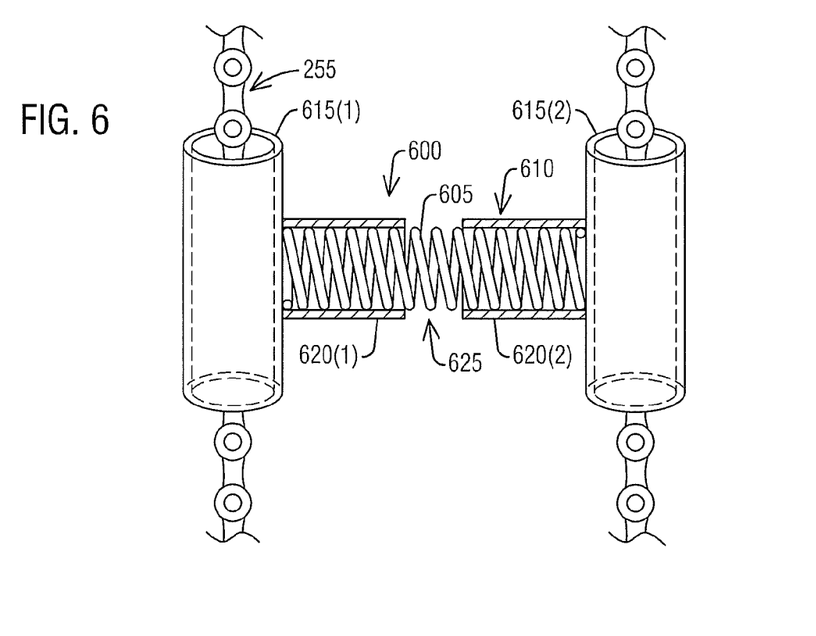
FIG. 6 illustrates a perspective view of a de-slacker device mounted on the chain interconnecting the two front wheel sprockets of the chain-driven front-drive mechanism according to one embodiment of the present invention.

As shown in FIG. 6, it illustrates a perspective view of a de-slacker device 600 mounted on the chain drive 255 interconnecting the two front wheel sprockets 505(1-2) of the chain-driven front-drive mechanism 245(2) according to one embodiment of the present invention. The de-slacker device 600 include a spring 605, a tube 610 and first and second rings 615(1-2). The spring 605 may be coupled to the tube 610 at on its free ends. In one embodiment, the spring 605 is kept floating inside the tube 610. The tube 610 has first and second portions 620(1-2) which define a gap 625. The gap 625 enables the spring 605 to expand and constrict such that the first and second rings 615(1-2) may be brought closer or kept farther depending upon a lengthening force acting on the chain drive 255 being at a certain rotational angle relative to the steering axis 225 which may be causing the chain drive 255 to expand or shrink in length.

The de-slacker device 600 may be made of fabricated steel, cast steel, cast iron, or synthetic materials such as nylon. The de-slacker device 600 may be of solid plate design, or be of any other suitable design using tubes and a metal spring which may be in a spiral form or a flat spring such as in a plate or a sheet form. Other suitable forms of resilience structures or resilience components may be deployed without deviating from the spirit and scope of the present invention.

Figure 7:
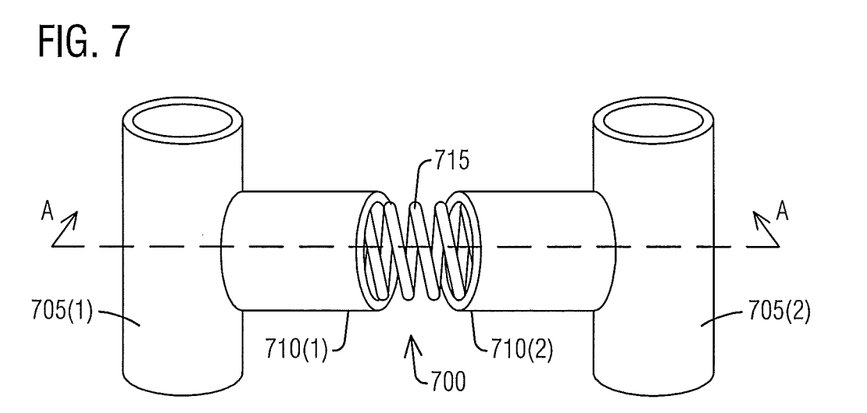
FIG. 7 illustrates a perspective view of a de-slacker device mounted on the chain interconnecting the two front wheel sprockets of the chain-driven front-drive mechanism according to another embodiment of the present invention.

In FIG. 7, it illustrates a perspective view of a de-slacker device 700 mounted on the chain drive 255 interconnecting the two front wheel sprockets 505(1-2) of the chain-driven front-drive mechanism 245(2) according to another embodiment of the present invention. The de-slacker device 700 includes first and second rings 705(1-2). The de-slacker device 700 includes a first tube portion 710(1) attached to the first ring 705(1) and a second tube portion 710(2) attached to the second ring 705(2) in a transverse relationship. The de-slacker device 700 includes a compression spring 715 having a desired resilience to keep the first and second rings 705(1-2) sufficiently apart to maintain a certain chain slack in the chain drive 255 such that an optimal rotational power transfer or transmission occurs between the two front sprockets 220(2-3) at all times during cycling.

The resilience of the compression spring 715 may be selected based on a longitudinal length of the chain drive 255. For example, a longer the longitudinal length of the chain drive 255, a higher the resilience of the compression spring 715 may be selected compared to a relatively shorter chain drive 255. Likewise, a length of the compression spring 715 may be selected based on a longitudinal length of the chain drive 255. For example, for a longer the longitudinal length of the chain drive 255, a longer the length of the compression spring 715 may be selected compared to a relatively shorter chain drive 255.

Figure 8:
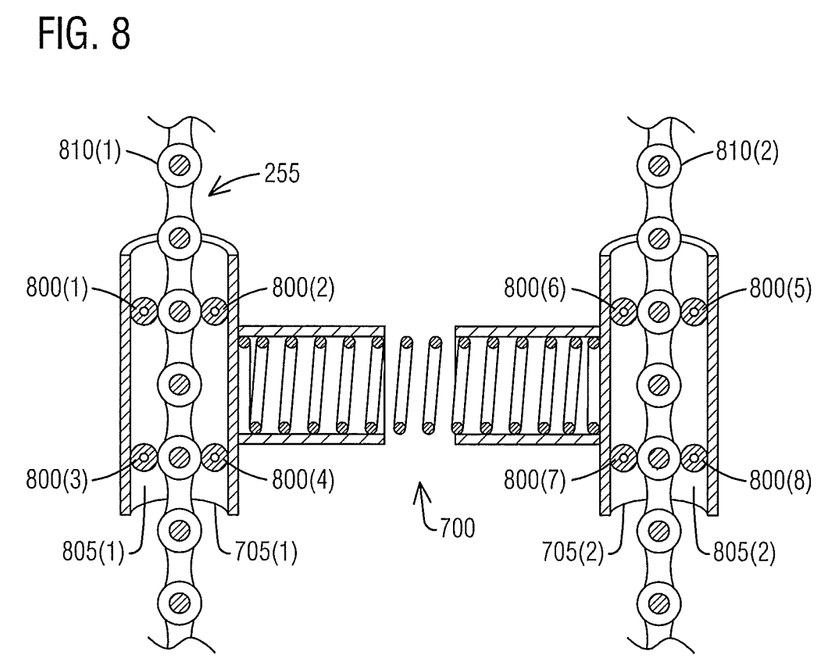
FIG. 8 illustrates a cross-sectional view of the de-slacker device of FIG. 7 at an axis A-A in FIG. 7 according to one embodiment of the present invention.

With regard to FIG. 8, it illustrates a cross-sectional view of the de-slacker device 700 of FIG. 7 according to one embodiment of the present invention. The de-slacker device 700 includes a set of first rollers 800(1-4) within the first ring 705(1) and a set of second rollers 800(5-8) within the second ring 705(2). The set of first rollers 800(1-4) are movably mounted on a first interior face 805(1) of the first ring 705(1). The set of second rollers 800(5-8) are movably mounted on a second interior face 805(2) of the second ring 705(2). The set of first rollers 800(1-4) are aligned to move in contact with a first link 810(1) of the chain drive 255. The set of second rollers 800(5-8) are aligned to move in contact with a second link 810(2) of the chain drive 255. The set of first rollers 800(1-4) and the set of second rollers 800(5-8) may be made of fabricated steel, cast steel, cast iron, or synthetic materials such as nylon. Although 4 rollers each are shown in the set of first rollers 800(1-4) and the set of second rollers 800(5-8), however, a number of rollers may vary based on a specific application from 2 to n.

Figure 9:
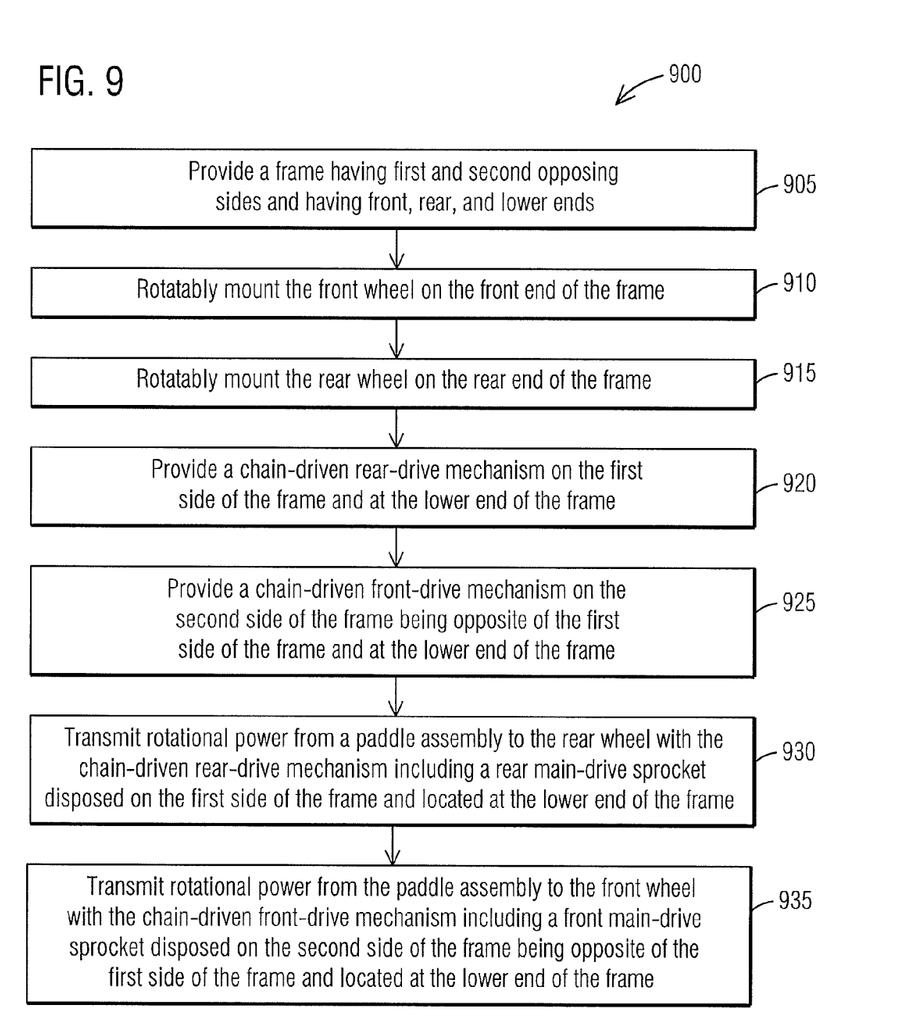
FIG. 9 illustrates a flow chart of a method of transmitting rotational power to a front wheel and a rear wheel of the two-wheel-drive bicycle of FIG. 2 according to one embodiment of the present invention.

With respect to FIG. 9, it illustrates a flow chart of a method 900 of transmitting rotational power to the front wheel 230(1) and the rear wheel 230(2) of the two-wheel-drive bicycle 200 of FIG. 2 according to one embodiment of the present invention. Reference is made to the elements and features described in FIGS. 1-8. It should be appreciated that some steps are not required to be performed in any particular order, and that some steps are optional.

In step 905, the method 900 includes providing the frame 205 having the first and second opposing sides 215(1-2) and having front, rear and lower ends. In step 910, the method 900 includes rotatably mounting the front wheel 230(1) on the front end of the frame 205. In step 915, the method 900 includes rotatably mounting the rear wheel 230(2) on the rear end of the frame 205. In step 920, the method 900 includes providing the chain-driven rear-drive mechanism 245(1) on the first side 215(1) of the frame 205 and located at the lower end of the frame 205. In step 925, the method 900 includes providing the chain-driven front-drive mechanism 245(2) on the second side 215(2) of the frame 205 being opposite of the first side 215(1) of the frame 205 and located at the lower end of the frame 205.

In step 930, the method 900 includes transmitting rotational power from the paddle assembly 237 to the rear wheel 230(2) with the chain-driven rear-drive mechanism 245(1) including a rear main-drive sprocket disposed on the first side 215(1) of the frame 205 and located at the lower end of the frame 205. In step 935, the method 900 includes transmitting rotational power from the paddle assembly 237 to the front wheel 230(1) with the chain-driven front-drive mechanism 245(2) including a front main-drive sprocket disposed on the second side 215(2) of the frame 205 being opposite of the first side 215(1) of the frame 205 and located at the lower end of the frame 205.

The method 900 further comprises mounting the chain drive 255 so as to enable movement of the chain-driven front-drive mechanism 245(2) to steer the front wheel 230(1) during cycling. The method 900 further comprises mounting the de-slacker device 700 on the chain drive 255 to control a chain slack in the chain drive 255. The de-slacker device 700 enables an increase and a decrease of a length of the chain drive 255 between the second front sprocket 220(2) and the third front sprocket 220(3) based on a compression and an expansion of the compression spring 715 of the de-slacker device 700, respectively. In a nominal position of the front wheel 230(1) being at a 0 degree of facing straight forward in a center the chain slack may be kept at a higher chain slack such as 4% but reduced to a lower chain slack such as 2% by the action or operation of the de-slacker device 700. The extra 2% chain slack may be available when the front wheel 230(1) is turning and the length of the chain drive 255 is increased.

The techniques described herein can be particularly useful for using a two-wheel-drive bicycle. While particular embodiments are described in terms of two-wheel-drive, the techniques described herein are not limited to two wheel bicycles but can also use other multi-wheel bicycles such as 3-wheel or other multi-wheel-drive bicycles.

As used herein, "a two-wheel-drive bicycle" refers to a bicycle that includes a dual chain-and-sprocket drive mechanism driven by a two-sided paddle-sprocket system for enabling a biker to cycle. The "two-wheel-drive bicycle," in addition to the exemplary hardware description above, refers to a bicycle that is configured to provide transit for traveling, operated by a gear system normally available in mountain bikes. The two-wheel-drive bicycle can include multiple interacting systems, whether located together or apart, that together perform processes as described herein.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as, a critical, required, or essential feature or component.

What is claimed is:

1. A two-wheel-drive bicycle, comprising:
a frame having front and rear portions and a center portion with upper and lower ends, wherein the frame having first and second opposing sides and the frame including a head tube having a first front sprocket mounted thereon;

a fork assembly attached to the front portion of the frame and pivotable about a steering axis, the fork assembly having a lower end and an upper end;

a front wheel rotatably mounted on the fork assembly, wherein the fork assembly straddling and rotatably supporting the front wheel at the lower end, wherein the fork assembly having a stem at the upper end for pivotally mounting the fork assembly in the head tube of the frame to enable steering of the front wheel about the stem;

a rear wheel rotatably mounted on the rear portion of the frame and having a rear sprocket;

a paddle assembly having first and second foot paddles, the paddle assembly mounted at the lower end of the center portion in a shared driving relationship with the front wheel and the rear wheel;

a chain-driven rear-drive mechanism configured for transmitting rotational power to the rear wheel, wherein the chain-driven rear-drive mechanism including a rear main-drive sprocket at the lower end of the center portion and disposed on the first side of the frame, wherein the chain-driven rear-drive mechanism coupled to the paddle assembly; and a chain-driven front-drive mechanism configured for transmitting rotational power to the front wheel, wherein the chain-driven front-drive mechanism including a front main-drive sprocket at the lower end of the center portion and disposed on the second side of the frame being opposite of the first side of the frame, wherein the chain-driven front-drive mechanism coupled to the paddle assembly.

2. The two-wheel-drive bicycle of claim 1, wherein the chain-driven front-drive mechanism including a second front sprocket mounted coaxially to the first front sprocket on a shaft at a spaced apart distance.

3. The two-wheel-drive bicycle of claim 2, wherein the chain-driven front-drive mechanism including a third front sprocket mounted coaxially to the front wheel.

4. The two-wheel-drive bicycle of claim 3, wherein the second front sprocket transfers rotational power from the chain-driven front-drive mechanism along the steering axis to the third front sprocket mounted in a driving relationship with the front wheel.

5. The two-wheel-drive bicycle of claim 4, wherein the chain-driven front-drive mechanism including a de-slacker device mounted on a chain interconnecting the second front sprocket and the third front sprocket to control a slack in the chain.

6. The two-wheel-drive bicycle of claim 5, wherein the de-slacker device having first and second rings on distal ends separated by a tube including a spring that spreads first and second links of the chain away from each other to control the slack in the chain.

7. The two-wheel-drive bicycle of claim 5, wherein the first link of the chain is threaded through the first ring of the de-slacker device and the second link of the chain is threaded through the second ring of the de-slacker device.

8. The two-wheel-drive bicycle of claim 5, wherein the de-slacker device enables an increase and a decrease of a length of the chain between the second front sprocket and the third front sprocket based on a compression and an expansion of the spring of the de-slacker device, respectively.

9. The two-wheel-drive bicycle of claim 1, wherein the chain-driven rear-drive mechanism and the chain-driven front-drive mechanism coupled to the paddle assembly via a common shaft having first and second arms attached thereto with the first arm coupled to the first foot paddle and the second arm coupled to the second foot paddle.

10. A multi-wheel-drive bicycle, comprising:

a frame having first and second opposing sides and having front, rear and lower ends, wherein a front wheel is rotatably mounted on the front end of the frame and a rear wheel is rotatably mounted on the rear end of the frame;

a chain-driven rear-drive mechanism configured for transmitting rotational power to the rear wheel, wherein the chain-driven rear-drive mechanism including a rear main-drive sprocket disposed on the first side of the frame and located at the lower end of the frame; and a chain-driven front-drive mechanism configured for transmitting rotational power to the front wheel, wherein the chain-driven front-drive mechanism including a front main-drive sprocket disposed on the second side of the frame being opposite of the first side of the frame and located at the lower end of the frame.

11. The multi-wheel-drive bicycle of claim 10, wherein the frame including a head tube having a first front sprocket mounted thereon and the chain-driven front-drive mechanism including a second front sprocket mounted coaxially to the first front sprocket on a shaft at a spaced apart distance.

12. The multi-wheel-drive bicycle of claim 11, wherein the chain-driven front-drive mechanism including a third front sprocket mounted coaxially to the front wheel.

13. The multi-wheel-drive bicycle of claim 12, wherein the second front sprocket transfers rotational power from the chain-driven front-drive mechanism along the steering axis to the third front sprocket mounted in a driving relationship with the front wheel.

14. The multi-wheel-drive bicycle of claim 13, wherein the chain-driven front-drive mechanism including a de-slacker device mounted on a chain drive interconnecting the second front sprocket and the third front sprocket to control a slack in the chain drive.

15. The multi-wheel-drive bicycle of claim 14, wherein the de-slacker device having first and second rings on distal ends separated by a tube including a spring that spreads first and second links of the chain drive away from each other to control the slack in the chain drive, wherein the first link of the chain is threaded through the first ring of the de-slacker device and the second link of the chain drive is threaded through the second ring of the de-slacker device, wherein the de-slacker device enables an increase and a decrease of a length of the chain drive between the second front sprocket and the third front sprocket based on a compression and an expansion of the spring of the de-slacker device, respectively.

16. The multi-wheel-drive bicycle of claim 10, further comprising:

a paddle assembly including a common shaft having first and second arms attached thereto with the first arm coupled to a first foot paddle and the second arm coupled to a second foot paddle, wherein the chain-driven rear-drive mechanism and the chain-driven front-drive mechanism coupled to the paddle assembly via the common shaft.

17. A method of transmitting rotational power to a front wheel and a rear wheel of a two-wheel-drive bicycle, the method comprising:

providing a frame having first and second opposing sides and having front, rear and lower ends;

rotatably mounting the front wheel on the front end of the frame;

rotatably mounting the rear wheel on the rear end of the frame;

providing a chain-driven rear-drive mechanism on the first side of the frame and at the lower end of the frame;

providing a chain-driven front-drive mechanism on the second side of the frame being opposite of the first side of the frame and at the lower end of the frame;

transmitting rotational power from a paddle assembly to the rear wheel with the chain-driven rear-drive mechanism including a rear main-drive sprocket disposed on the first side of the frame and located at the lower end of the frame; and transmitting rotational power from the paddle assembly to the front wheel with the chain-driven front-drive mechanism including a front main-drive sprocket disposed on the second side of the frame being opposite of the first side of the frame and located at the lower end of the frame.

18. The method of claim 17, further comprising:

mounting a chain drive so as to enable movement of the chain-driven front-drive mechanism; and mounting a de-slacker device on the chain drive to control a slack in the chain drive.

* * * * *